United States Patent [19]
Berto

[11] Patent Number: 5,460,575
[45] Date of Patent: Oct. 24, 1995

[54] DRIVE CLUTCH WITH VARIABLE RATE BIASING MEANS AND A METHOD FOR CONTROLLING A DRIVE CLUTCH

[76] Inventor: Joseph J. Berto, 6539 Rogue River Dr., Shady Cove, Oreg. 97539

[21] Appl. No.: 294,043

[22] Filed: Aug. 24, 1994

[51] Int. Cl.⁶ .................................................. F16H 55/52
[52] U.S. Cl. ............................. 474/11; 474/13; 474/46
[58] Field of Search ............................ 474/8, 11–14, 474/46

[56] References Cited

U.S. PATENT DOCUMENTS

| | | | |
|---|---|---|---|
| 824,022 | 6/1906 | James. | |
| 1,501,705 | 7/1924 | Decoux. | |
| 1,880,181 | 9/1932 | Turner. | |
| 2,326,468 | 8/1943 | Koch | 74/230.17 |
| 2,511,254 | 6/1950 | Fulton | 267/60 |
| 2,611,277 | 9/1952 | Mitchell | 74/230.17 |
| 3,015,237 | 1/1962 | Musgrave | 74/230.17 |
| 3,180,164 | 4/1965 | Chung | 74/230.17 |
| 3,362,242 | 1/1968 | Watkins | 74/230.17 |
| 3,383,934 | 5/1968 | Flynn | 74/230.17 |
| 3,628,389 | 12/1971 | Wiegelmann et al. | 74/230.17 |
| 3,698,256 | 10/1972 | Albertson | 74/230.17 E |
| 3,709,052 | 1/1973 | Lassanske | 74/230.17 E |
| 3,824,867 | 7/1974 | Brooks | 74/230.17 E |
| 3,875,814 | 4/1975 | Steuer | 74/194 |
| 3,939,720 | 2/1976 | Aaen et al. | 74/230.17 E |
| 3,958,461 | 5/1976 | Aaen et al. | 74/230.17 E |
| 3,967,509 | 7/1976 | Teal | 74/230.17 M |
| 3,975,964 | 8/1976 | Adams | 74/230.17 A |
| 4,094,204 | 6/1978 | Yamamoto et al. | 474/46 X |
| 4,149,425 | 4/1979 | Williams | 74/230.17 C |
| 4,571,216 | 2/1986 | Stieg et al. | 474/8 |
| 4,881,926 | 11/1989 | Aoki et al. | 474/13 X |
| 4,919,643 | 4/1990 | Fuss et al. | 474/46 |
| 5,326,330 | 7/1994 | Bostelmann | 474/13 |

OTHER PUBLICATIONS

Aaen Performance™, "The Power Factory," '91 Snow Catalog, Kenosha, Wis. 53140.
Bender Racing, "Snowmobile Clutch Reference Guide," Colden, N.Y. 14033.
Olav Aaen's "Clutch Tuning Handbook," Kenosha, Wis. 53140 (1993).
Polaris Master Repair Manual, Section VII, "Torque–O–Matic Drive," pp. VII–1–VII–27, Roseau, Minnesota (1991).

Primary Examiner—Michael Powell Buiz
Attorney, Agent, or Firm—Burns, Doane, Swecker & Mathis

[57] ABSTRACT

A drive clutch assembly having a fixed sheave and a movable sheave rotatable with the drive shaft of an engine comprising a variable rate biasing or resistance system for urging a movable sheave toward a retracted position, the biasing system initially applies a first predetermined resistance to the movable sheave as it moves toward the fixed sheave and applies a second predetermined resistance to the movable sheave when the movable sheave reaches a predetermined axial position.

36 Claims, 6 Drawing Sheets

DRIVE CLUTCH WITH VARIABLE RATE BIASING MEANS AND A METHOD FOR CONTROLLING A DRIVE CLUTCH

FIELD OF THE INVENTION

The present invention relates to variable speed belt transmissions often used in snowmobiles, golf carts, off-road recreational vehicles, etc. More particularly, the invention relates to a drive clutch with a variable rate biasing or resistance means.

It is an object of the present invention to improve significantly the fuel efficiency of such vehicles and to reduce engine noise and vibration using the infinitely variable "gear ratio" between the drive and driven clutches of such a transmission. It is a further object of the present invention to "tune" the transmission so that the engine turns at a predetermined speed when the vehicle is at a constant throttle setting, as when cruising down a road, so that maximum fuel economy and minimum noise levels are obtained. In particular, using the full power band of the engine with the lower part being used for fuel efficiency and the upper part being used for performance (high speed).

It is also an object of the present invention to improve the up-shifting and back-shifting of the transmission in response to both engine speed and vehicle speed. It has long been known that up-shifting, as the vehicle drive belt or wheels increase speed, is readily controlled by progressively increasing engine speed as the vehicle accelerates. However, when the vehicle speed decreases under an increasing load, as in hilly terrain where it is necessary to brake the vehicle for a sharp turn followed immediately by a long steep incline, it is essential for the transmission to respond by promptly down shifting to deliver enough torque to match the vehicle load.

As particularly contrasted to the conventional use of a single rate spring, the axial force of two biasing means (i.e., compression springs) or a single compound biasing means can counter-balance the axial force generated by the centrifugal action of a flyweight speed governor in the drive clutch in a more suitable manner than is possible with a single rate spring. I have discovered that two biasing means axially aligned, but separated by a flanged bushing engageable with a fixed stop so as to limit the compressive force of the flyweights on one biasing means without interfering with the response of the other biasing means, can be used, or that two biasing means co-axially aligned with an end of one biasing means extending beyond the end of the other biasing means can be used, or that a first resistance means in compression and a second resistance means in tension. The net unexpected result is that the lower part of the power band of the engine can be used for fuel efficiency at normal cruising speeds and the upper part of the power band (i.e., the peak power) can be used for performance speeds.

BACKGROUND OF THE INVENTION

A great many vehicles, such as snowmobiles, have a variable speed belt transmission driving system (sometimes referred to as torque converters). In such a system, there is a drive or driving clutch with a movable conical faced sheave and a fixed conical faced sheave, a driven clutch with a movable conical faced sheave and a fixed conical faced sheave, a transmission belt extending between each pair of sheaves coupling the driving and driven clutches, a speed responsive or displacement means such as a plurality of cams, flyweights or other means which are operatively associated with the movable sheave of the driving clutch and a biasing or resistance means in the driving and driven clutch to oppose the speed responsive or displacement means.

The purpose of the driving clutch is to control the speed of the engine in all gear ratios as the transmission changes gears. There is a biasing or resistance means in the driving clutch that works against the speed responsive or displacement means associated with the movable sheave. The driving clutch can be adjusted to achieve a predetermined desired engine speed by modifying the speed responsive or displacement means or, in accordance with this invention, by modifying the biasing or resistance means.

The purpose of the driven clutch is to provide enough side pressure on the transmission belt to allow power to be transmitted from the driving clutch to the driven clutch without the belt slipping. The side pressure on the belt has a lot to do with power loss and backshifting. The higher the belt pressure, the quicker the backshifting but the higher the power loss, also. Therefore, the driven clutch biasing means is selected to be a compromise between quick backshifting and low power loss. High belt side pressure also results in increased belt wear and shorter belt life.

In operation, what happens is that at low rotational speeds of the driving clutch, the fixed and movable sheaves of the driving clutch are forced apart by a biasing or resistance means (e.g., compression spring) parallel to the centerline of a drive shaft running between the fixed and axially movable sheaves, thus enabling the transmission belt to ride near the bottom of the driving clutch thereby creating a small diameter drive wheel. Correspondingly, the sheaves of the driven clutch are forced close together by a biasing means parallel to the centerline of a drive shaft running between the fixed and movable sheaves, thus causing the transmission belt to operate near the outer edge of the conical faces of the driven clutch sheaves thereby creating a large diameter driven wheel. Therefore, at low speeds a small diameter drive wheel clutch is coupled by the transmission belt to a large diameter driven wheel. This is, in effect, a low gear since it requires many turns of the drive wheel to cause one rotation of the driven wheel.

As the rotational speed of the driving clutch increases in response to increased engine speed, speed responsive or displacement means (i.e., cams or flyweights) operatively associated with the movable sheave of the driving clutch, and opposed by the biasing or resistance means located on or parallel to the centerline of the driving clutch as well as side pressure on the transmission belt caused by the biasing means in the driven clutch, force the movable sheave of the driving clutch closer to the fixed sheave thereby causing the transmission belt to move outward on the conical radius of the drive wheel so as to operate at a greater distance from the center of the driving clutch. The forces on the transmission belt which cause it to move upward along the conical radius of the drive wheel also cause it to move inwardly against the side pressure along the radius of the driven wheel thus forcing the movable sheave of the driven clutch away from its associated fixed sheave. Thus higher rotational speeds of the driving clutch cause the transmission belt to effectively form a large diameter drive wheel and a small diameter driven wheel. This is, essentially, a high gear since it enables one complete rotation of the drive wheel to cause several complete rotations of the driven wheel. This means that such a transmission belt drive system has a built-in capability of effectively switching from a low gear to a higher gear as the rotational speed of the drive wheel is increased.

However, there is an inherent disadvantage to this type of system in which the gear ratio is automatically changed with an increase or decrease in rotational speed of the drive clutch. This disadvantage exists because the gear ratio change can occur at a time when constant speed is desired such as when travelling down a road or trail or the gear ratio can remain fixed at a time when it should be varied, such as when encountering an increased load like a hill or a turn.

Consider, for example, a snowmobile which utilizes the transmission belt drive system. Normally, a low gear is needed to get the machine moving but after it has commenced moving and the throttle is advanced, the gear ratio begins to change in order to place the vehicle in a higher gear. This is normal operation and no problem occurs.

When it is desired to travel at a constant speed the transmission will operate in a higher gear ratio than is needed if the clutch has been tuned to operate at the top of the power band thereby forcing the operator to drive in a higher gear than is necessary for the given conditions. This results in high power output and poor fuel economy.

Further, assume it is desired to climb a hill or in some manner the load placed upon the vehicle is increased. If the vehicle is travelling at a high rate of speed the driving clutch rotational speed is high and the machine is in a high gear ratio. However, when a vehicle is attempting to climb a hill or move a heavy load under increasing load conditions, it needs a lower gear ratio, therefore such a higher gear ratio is an undesirable situation. That is, at this time greater torque is needed at the driven wheel, not greater speed. In order to achieve greater torque, the transmission must backshift.

Therefore, a particular disadvantage of this type of known system is that the vehicle is slow to backshift, (i.e., downshift) in response to this need for greater torque. The reason being that a compression spring that initially pushes the sheaves of the driving clutch apart and the compression spring that initially pushes the sheaves of the driven clutch together is a constant rate spring that is selected to compromise between a spring that upshifts quickly or downshifts quickly. If the spring rate is high, the transmission will upshift slowly but downshift quickly. If the spring rate is low, the transmission will upshift quickly but downshift slowly.

There is a long-felt need for a device which will overcome these problems and allow the driving system to upshift quickly when a higher speed is desired and downshift quickly when more torque is needed in addition to allowing the engine to be operated at either its most fuel efficient speed setting or its most powerful speed setting.

Two-stroke engines that commonly use variable speed transmission belt driving systems operate more efficiently when operated in a power band 94 shown in the speed diagram in FIG. 1. See Olav Aaen, "Clutch Tuning Handbook", Kenosha, Wis. (1993). The speed diagram has the engine speed (rpm) on the vertical axis and the vehicle speed (mph) on the horizontal axis. Line 88 represents the low gear ratio of a typical variable speed transmission. The low gear ratio occurs where the transmission belt is near the bottom of the sheaves of the driving clutch and near the outer edges of the sheaves of the driven clutch. Typically, the low gear ratio is 3:1, whereby the driven clutch rotates one time for every three rotations of the driving clutch.

Line 90 represents the high gear ratio of the transmission. The high gear ratio occurs where the belt is near the outer edges of the driving clutch and near the bottom of the sheaves of the driven clutch. Typically, the high gear ratio in overdrive is 0.75:1, whereby the driven clutch rotates one time for every ¾ of a rotation of the driving clutch.

Line 92 is a typical shift curve of a two-stroke engine with a power peak at 8250 rpm. The power band 94 is shown by the shaded area. The power band 94 represents a range of engine speeds in which the engine is delivering optimum power. The top 96 of the power band 94 is the power peak of the engine. Operating the engine at its power peak is ideal for performance (high speed) riding. The bottom 98 of the powerband 94 is ideal for fuel efficiency because the engine is not creating more horsepower than is needed to move the vehicle at normal cruise speeds.

Two points on the speed diagram that are of particular importance are the engagement speed 100 and the shift-out speed 102. The engagement speed 100 is the engine speed (rpm) required to start the vehicle moving. At the engagement speed 100, the speed responsive or displacement means in the driving clutch overcome the pretension of the biasing or resistance means in the driving clutch and start moving the movable sheave toward the fixed sheave until enough force is exerted on the belt to start the vehicle moving. After the driving sheaves have gripped the belt without slipping the vehicle will accelerate along the low ratio line 88. While the vehicle speed is increasing in the low gear ratio, the belt remains at the bottom of the driving sheaves.

The second important point occurs when the engine speed has built up enough centrifugal force in the speed responsive or displacement means to overcome both the pressure of the biasing or resistance means in the driving clutch and the side pressure on the belt by the biasing means in the driven clutch, the belt will move out on the driving sheaves, move in on the sheaves of the driven clutch, and the ratio of the transmission will change (i.e., shift up). This is the shift-out speed 102 and should be within the power band 94.

Typically, the shift curve 92 is in the power band 94 of the engine and is essentially straight from the shift-out speed 102 to the high ratio line 90. This means the engine speed is held constant in the area where the engine is delivering optimum power while the transmission ratio is changing (i.e., the transmission is up-shifting) and thus the vehicle speed is increasing.

As noted before, the purpose of the driven clutch is to provide enough side pressure on the belt to allow power to be transmitted to the ground to move the vehicle. However, too much side pressure results in reduced belt life, power loss, and decreased efficiency. In operation, more side pressure is needed in low ratio (about twice as much) than is needed in high ratio therefore typical driven clutches have a torsion spring and torque feed back ramp design that produces such a desired effect in the belt side pressure.

An object of the present invention is to match the biasing or resistance means of the driving clutch along with the belt pressure created by the driven clutch to the speed responsive or displacement means so that the engine speed is held at or near bottom 98 of the power band 94 for maximum engine efficiency (i.e., fuel efficiency), reduced noise and reduced vibration from the low ratio line 88 to predetermined speed 107. Predetermined speed 107 is selected to correspond with a maximum normal cruise speed. At speed 107, it is an object of the present invention to match the biasing or resistance means of the driving clutch along with the belt pressure created by the driven clutch to the speed responsive or displacement means so that the engine speed is held at or near top 96 of power band 94 for performance speeds from speed 107 to high ratio line 90.

It is commonly accepted to use a single spring with a constant spring rate as the biasing or resistance means in both the drive and driven clutches, as shown in U.S. Pat. No. 3,362,242 to Watkins and U.S. Pat. No. 3,709,052 to Lassanske.

This is a simple means to offset the initial axial displacement of the sheaves but the disadvantage to this approach is that the linear spring rate provided by one spring does not take into account the parasite drag of the vehicle or the varying terrain that the vehicle might encounter. Parasite drag is the drag on the vehicle caused by wind resistance, sliding resistance, etc. The parasite drag on a vehicle increases non-linearly as the speed of the vehicle increases. Take for example, when a snowmobile is moving at a relatively low speed, say 40 miles per hour, it requires approximately 25 horsepower. But when the snowmobile is moving twice as fast (i.e., 80 miles per hour), it requires approximately 90 horsepower. It would be desirable to have a biasing means that had a variable spring rate so that as the belt rises up on the drive wheel, the movable sheave would be slowed in its movement by increased axial resistance so that more torque would be delivered at the driven wheel to compensate for the parasite drag. On the other hand, when drag is low the engine speed (rpm) should be low so as to maximize efficiency while still optimizing the gear ratio of the shift-out period.

In addition, two-stroke engines that commonly use such transmission belt driving systems operate more efficiently when operated within the power band discussed above. Therefore, it is also desirable to have a system that allows the engine to operate within this band (i.e., operate at a relatively constant speed), while allowing the output of the system at the driven clutch to vary so as to match the needs of either greater torque or increased speed, as discussed above.

U.S. Pat. No. 3,945,964 to Adams, discloses a variable rate biasing means consisting of two helical springs. However, Adams is directed to achieving a constant output system where the engine operates over a range of speeds so that the speed of the driven wheel will stay constant. In Adams, the springs are arranged to provide a non-linear rate of axial displacement of the movable sheave of the driving clutch and consequently a non-linear rate of speed ratio change.

The non-linear rate of axial displacement of the moveable sheave from the fixed sheave is accomplished by providing sequentially operating springs of different spring rates (i.e., a light spring and a heavy spring). Initially, the heavy spring is preloaded (i.e., partially compressed) between two washers and the light spring is located between a movable sheave on the driving clutch and one of the washers. In operation, the lighter spring is compressed as the speed of the driving clutch is increased and deflects to produce a first rate of axial displacement, then at a predetermined point the light spring is stopped from further compression when a shoulder on the movable sheave contacts the washer between the light spring and the heavy spring. Then the heavy spring will independently start to deflect, or compress, giving a second rate of axial displacement. Adams does not show the use of two springs initially acting simultaneously, before a heavy spring is stopped from deflecting.

It is desirable in variable speed belt transmissions to have a variable rate biasing or resistance means that has a biasing or resistance means in which the first rate is relatively low and then at a predetermined point the rate changes to a higher second rate relatively so as to control the back shift or upshift of the transmission.

SUMMARY OF THE INVENTION

The present invention fulfills the desires discussed above by providing a variable rate biasing or resistance means for a driving clutch that maximizes the fuel efficiency of the engine when parasite drag is low and enhances the upshift and backshift capabilities of the transmission system. The present invention is a novel combination of two biasing or resistance means used to provide variable axial resistance to the movable sheave of a driving clutch so that the movable sheave encounters increased resistance as the parasite drag of the vehicle increases. The combination is also used to provide quicker, smoother shifting of the vehicle.

In accordance with a preferred embodiment of the invention, a vehicle is propelled by an engine having a drive shaft directly connected to a drive clutch assembly through a center column or shaft. The center column or shaft includes an axially fixed sheave end and a drive shaft attaching end. A fixed sheave is affixed adjacent one end of the center column or shaft for common rotation therewith, and an axially movable sheave is arranged to move along the center column or shaft. The axially movable sheave moves between a retracted position spaced from the fixed sheave and is actuated by a speed responsive or displacement means for displacing the movable sheave toward the fixed sheave in accordance with an increase in the speed of the drive shaft. The speed responsive or displacement means displaces the movable sheave in an amount and to an extent to control the load transferred to a driven clutch by the axially movable sheave and the fixed sheave of the drive clutch through an endless belt. A variable rate biasing or resistance means initially urges the movable sheave toward the retracted position.

To achieve improved fuel efficiency and shifting, the variable rate biasing or resistance means in one embodiment comprises a first biasing means having a first end and a second end, and a second biasing means having a first end and a second end. An end plate is attached to the movable sheave and is also axially movable relative to the center column or shaft. The variable rate biasing means is located between the end plate and the speed responsive or displacement means. A flanged bushing, axially movable relative to the center column or shaft, abuts the second end of the first biasing means and the first end of the second biasing means to combine the force applied to each biasing means into a single spring rate compressive force. There is a bushing stop having a shoulder, which initially allows the first biasing means and the second biasing means to be compressed simultaneously as the movable sheave moves toward the fixed sheave. The flanged bushing prevents further compression of the first biasing means at a predetermined axial position when the flanged bushing abuts the shoulder of the bushing stop, but without interfering with further compression or decompression of the second biasing means. The variable rate biasing or resistance means initially applies a first predetermined resistance as the movable sheave moves toward said fixed sheave and a second predetermined resistance when the movable sheave reaches a predetermined axial position.

In another embodiment of the drive clutch assembly of the type previously described, the variable rate resistance means comprises a first resistance means having a first end and a second resistance means having a first end. The first and second resistance means are mounted coaxially so that the first end of the first resistance means extends past the first end of the second resistance means. The first resistance means initially is compressed alone as the movable sheave moves toward the fixed sheave, then the first resistance means and second resistance means are compressed simultaneously when the movable sheave reaches a predetermined axial position.

In yet another embodiment of the drive clutch assembly of the type previously described, the variable rate resistance means comrpises a first resistance means mounted between the displacement means and end cap. A second resistance is mounted between the end cap and a collar attached to an end of the shaft.

In another one of its method aspects, the present invention provides a method for controlling a drive clutch of the type previously described, the method comprising the following steps. Applying a first predetermined resistance with the variable rate biasing or resistance means as the movable sheave moves toward the fixed sheave. Applying a second predetermined resistance with the variable rate biasing or resistance means when the movable sheave reaches a predetermined axial position.

A kit is also provided for improving the performance of a drive clutch assembly of the type described above. In such kit, a conventional single compression spring, either having a uniform or non-uniform wire gage, coil diameter or coil pitch, is replaced by two separate axially alignable compression springs that are isolated by a flanged bushing, and if desired a cap is also provided to replace a conventional end plate so that the pretension applied to the two compression springs can be adjusted.

BRIEF DESCRIPTION OF THE DRAWING

The invention will now be described with reference to the accompanying drawing, in which.

DETAILED DESCRIPTION OF THE INVENTION

The discussion of the present invention is with reference to a snowmobile, but it is well recognized in the art that transmission belt driving systems (i.e., torque converters) are used in many difference vehicles such as golf carts, go-karts, all terrain vehicles, riding lawn mowers, electric powered cars, etc., as well as on many different types of machines used in the manufacturing and service industries.

Figure 2:
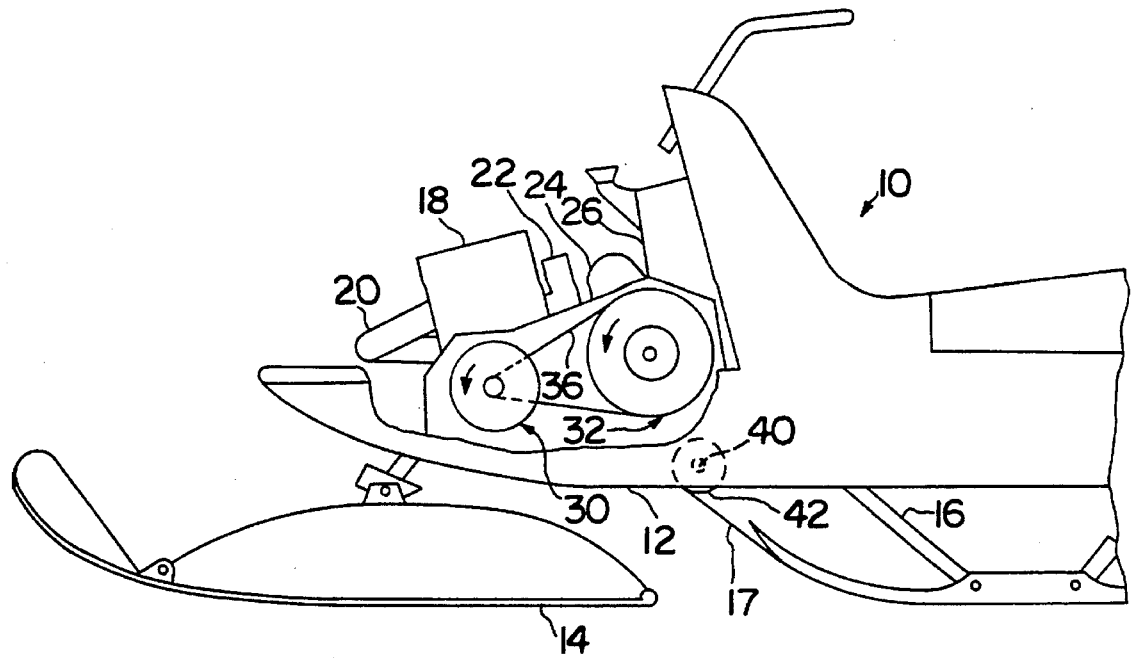
FIG. 2 is a partial left side elevation view of a snowmobile showing a portion of a transmission belt driving system.
Figure 3:
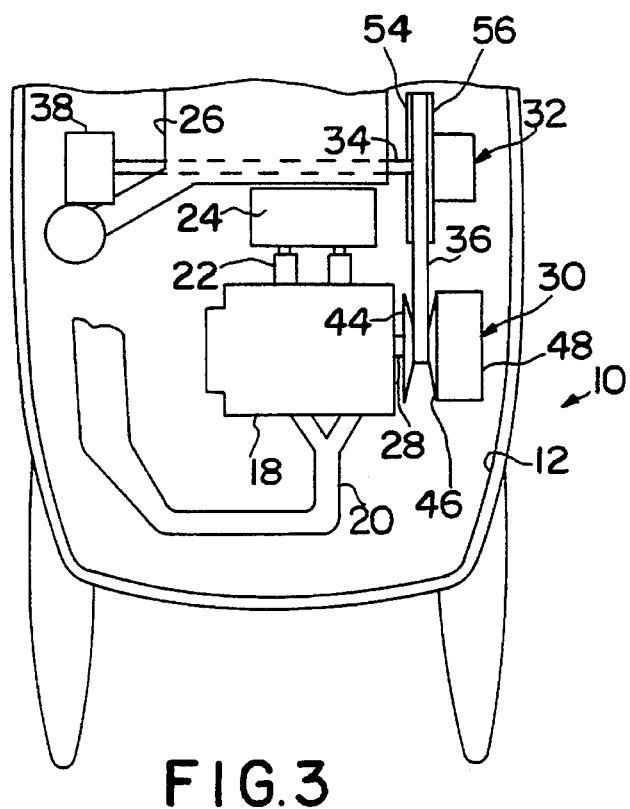
FIG. 3 is a top plan view of a portion of the snowmobile drive system shown in FIG. 1.

Referring now to FIGS. 2 and 3, therein is shown a snowmobile indicated in its entirety by the reference numeral 10. Snowmobile 10 includes a longitudinally extending frame or body 12 partially supported on a pair of forwardly located skis 14 and on a rearwardly located drive track assembly including a suspension member 16 and an endless drive track 17. An engine compartment, normally covered by a hood (not shown) is located at the forward end of snowmobile 10 and contains an internal combustion engine 18 to the forward and rearward sides of which are respectively connected an exhaust pipe 20 and a carburetor 22. Located just behind and coupled to the carburetor 22 is an intake silencer 24 and just behind the intake silencer 24 is a fuel tank 26.

A transmission belt driving system is connected between a horizontal drive shaft 28, projecting from the left side of engine 18, and drive track 17. The transmission system includes a driving clutch, shown generally at 30, mounted on engine drive shaft 28 and a driven clutch, shown generally at 32, mounted on a driven shaft 34 rotatably mounted on snowmobile frame 12 so that it is parallel with drive shaft 28. Endless drive belt 36 connects driving clutch 30 to the driven clutch 32. Located at the right side of the snowmobile is a chain case which houses a chain drive (not shown) which may be of any known type to one of ordinary skill in the art. The input to the chain drive is driven shaft 34 while the output of the chain drive is a cross shaft 40 on which is mounted a pair of drive sprockets 42 (only one shown) that are drivingly engaged with drive track 17.

Driving clutch 30 is mounted so that a fixed sheave 44 of driving clutch 30 is inboard of an axially movable sheave 46 of driving clutch 30 having a housing 48 secured thereto for movement therewith and enclosing a conventional speed responsive or displacement mechanism for shifting axially movable sheave 46 toward fixed sheave 44 of driving clutch 30 in increasing amounts in response to increasing rotational speed of drive shaft 28.

The operation of the snowmobile transmission belt driving system is as follows. When engine 18 (FIG. 3) of snowmobile 10 is idling, drive shaft 28 rotates at a speed insufficient to activate speed responsive or displacement elements 38 (FIG. 4) of driving clutch 30 and sheaves 44 and 46 are held fully apart by the compressive resistance of the biasing or resistance means, as shown generally at 60, of the driving clutch 30 such that belt 36 rides loosely at radially inner portions of the opposed conical faces of sheaves 44 and 46. With belt 36 loose, no force is transferred thereby to driven clutch 32 (FIG. 3) and its sheaves 54 and 56 are held fully closed by the unopposed action of the driven clutch biasing means so that belt 36 loosely engages radially outer portions of the opposed faces of the driven clutch sheaves 54 and 56.

Figure 4:
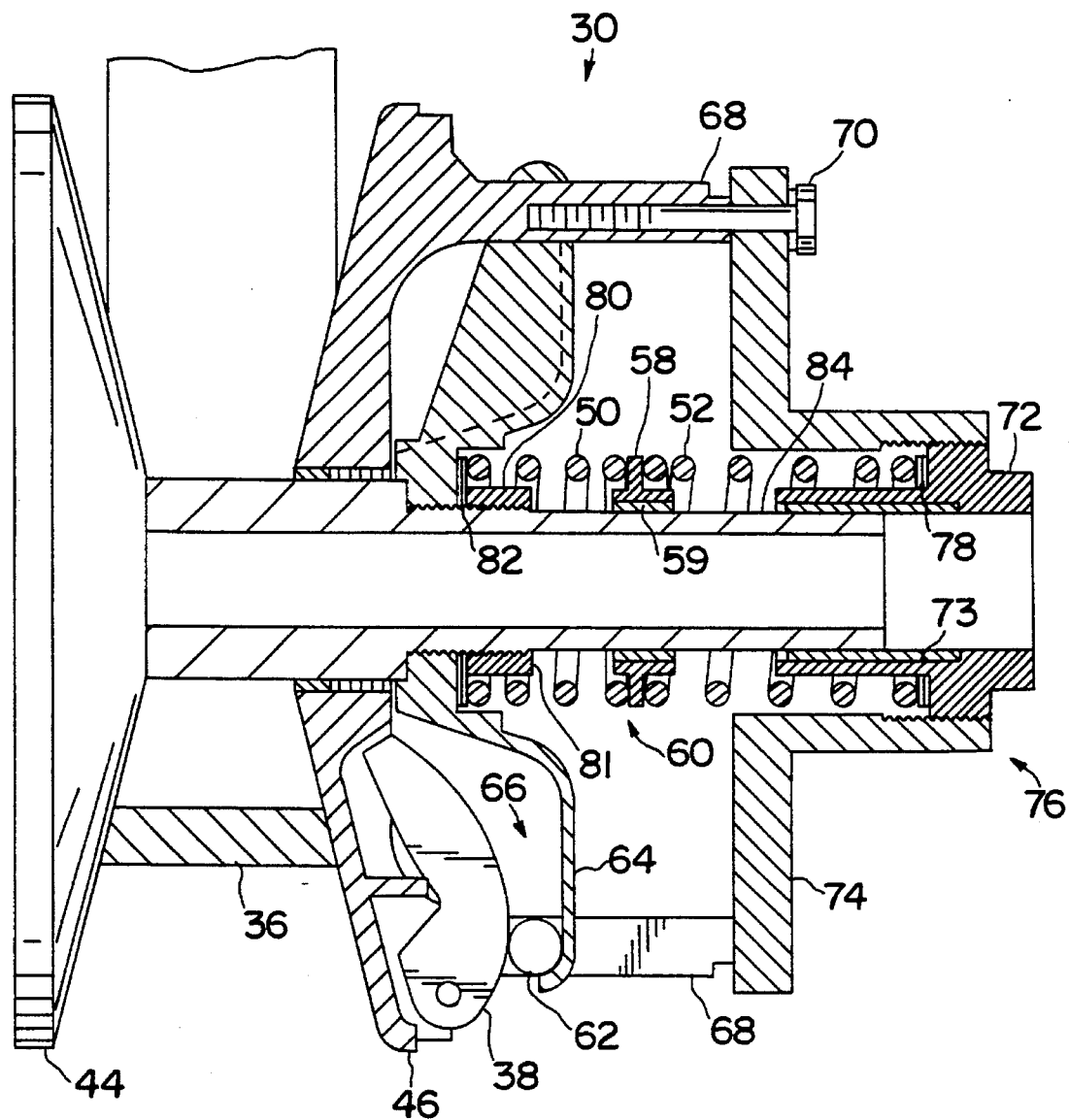
FIG. 4 is a top plan sectional view partially in cross-section of the drive clutch of the present invention.

In one embodiment, as engine 18 speeds up, speed responsive or displacement elements 38 of driving clutch 30 react to move axially moveable sheave 46 of driving clutch 32 towards fixed sheave 44 in opposition to the biasing or resistance force of the variable rate biasing or resistance means 60 made up of first biasing or resistance means 50, second biasing or resistance means 52, and flanged bushing 58 (as best seen in FIG. 4) of driving clutch 30. This movement of axially moveable sheave 46 results in belt 36 being engaged with the opposed conical faces of sheaves 44 and 46 and thereby being tensioned. Due to the increased frictional engagement of belt 36 with the faces of axially moveable sheave 46 and fixed sheave 44, belt 36 is gripped tighter and tighter by the driving clutch 30 until the force delivered by belt 36 to driven clutch 32 is sufficient to overcome the torque resistance offered by driven shaft 34, which resistance incidentally is quite high when track 17 is at rest. At this time, the transmission will be in a low speed, high torque delivery condition with belt 36 positioned inwardly on driving clutch 30 and outwardly on driven clutch 32, as illustrated in FIGS. 2 and 3.

Once snowmobile track 17 (FIG. 2) begins to rotate, the torque resistance offered by the driven shaft 34 decreases. It will be appreciated by one of ordinary skill in the art that the action of speed responsive or displacement elements 38 of driving clutch 30 act against the biasing means of the driven clutch and driving clutch so as to continuously effect an equilibrium condition in the transmission. As a result, the drive ratio of the transmission is thus continuously and infinitely variable in response to these two actions to attempt to produce a drive ratio suited to the existing operating conditions.

Conventional clutch tuning only allows tuning for either maximum performance or fuel efficiency. The present invention is a novel design for tuning a driving clutch to have the biasing or resistance means of the driving clutch and the belt side pressure supplied by the driven clutch match the speed responsive or displacement means in such a way that the engine is held near the power peak (maximum horsepower) all the way from low ratio to high ratio at full throttle and in such a way that the engine is held near the bottom of the power band for normal cruising speeds at partial throttle for maximum fuel efficiency, reduced noise, and reduced vibration.

With reference to FIG. 4, one embodiment of the present invention is discussed. As the drive shaft (not shown) rotates and the speed of driving clutch 30 increases, speed responsive or displacement elements 38 (e.g., cams, weights, flyweights, etc.) (only one shown) are thrown outward against rollers 62 (only one shown) by centrifugal force. Speed responsive or displacement elements 38 acting on rollers 62 push axially movable sheave 46 of drive clutch 30 toward fixed sheave 44. Since sheaves 44 and 46 are tapered, this axial movement causes endless drive belt 36 to ride up the conical surfaces of both sheaves 44 and 46. Variable rate biasing or resistance means 60, made up of first biasing or resistance means 50, second biasing or resistance means 52, and flanged bushing 58, is under compression between speed responsive or displacement means housing 64 and end cover 74. The force of variable rate biasing or resistance means 60 is transmitted through towers 68 and tower bolts 70 (only one shown) to moveable sheave 46 to oppose the force from speed responsive or displacement elements 38. The friction created by drive belt 36 against sheaves 44 and 46 allows torque to be transmitted to a driven clutch (not shown) which works in a similar opposing manner, providing an infinitely adjustable source of torque.

In accordance with one embodiment, flanged bushing 58 is located between a first biasing or resistance means 50 and a second biasing or resistance means 52. Flanged bushing 58 can be provided with a flanged bushing sleeve 59 or bearings to help facilitate axial movement along center column or shaft 84. First biasing or resistance means 50 is a heavy rate compression spring, preferably in the range of 150 to 400 lbs/in, and more preferably in the range of 250 to 300 lbs/in. The coil diameter should be sufficiently large to pass over the outside diameter of bushing stop 80 so as to prevent binding or friction of the coils against the bushing stop. Typically, the coil diameter is in the range of 1.40 to 2.50 inches. The wire diameter is typically in the range of 0.140 to 0.270 inches.

Second biasing or resistance means 52 is a lighter rate compression spring, preferably with a spring rate in the range of 75 to 300 lbs/in, and more preferably in the range of 190 to 280 lbs/in. The coil diameter should be sufficiently large to not contact the portion of threaded end cap 72 that biasing or resistance means 52 passes over. Typically, the coil diameter is in the range of 1.40 to 2.50 inches. The wire diameter is typically in the range of 0.140 to 0.270 inches.

In another embodiment, a compression spring having a varying wire diameter or pitch can be used so that the spring produces a varying spring rate. A disc can be slipped between two of the coils at a predetermined point, thus producing in effect two separate springs with different spring rates similar to those discussed above.

The biasing or resistance means are illustrated as helical coil springs but the biasing or resistance means can be a variety of biasing or resistance means such as electromechanical actuators, mechanical actuators, pneumatic actuators, hydraulic actuators, elastomers, wave springs, air bladders, pneumatic devices, hydraulic devices, electromechanical devices, etc. Likewise, the speed responsive or displacement means is illustrated as flyweights but can be a variety of means such as a ramp and balls combination, an actuator or a device of the type just listed, etc.

There are several important considerations in using the variable ratio transmission belt driving system of the present invention. First, setting the engine speed at which movable sheave 46 of driving clutch 30 engages endless belt 36 as the rotational speed of the driving clutch is increased (i.e., engagement point 100 in FIG. 1). Second, setting the engine speed at which speed responsive or displacement means 38 overcomes the side pressure of the driven clutch and variable rate biasing or resistance means 60 of driving clutch 30 so that belt 36 starts to move outward or shiftout on driving clutch sheaves 44, 46 (i.e., shiftout point 102 in FIG. 1). For maximum performance, the shiftout point 102 should be at the power peak of the engine at the top of power band 96. For maximum fuel efficiency, the shiftout point 102 should be at the lower part of power band 96. Third, setting the rate at which the movable sheave moves axially relative to the acceleration rate and thus the rate at which belt 36 moves outward on driving clutch sheaves 44, 46 during the low parasite drag. In other words, setting the shift rate during low parasite drag (i.e., portion 104 of shift curve 93). Fourth, setting the rate at which the movable sheave moves axially and thus the rate at which belt 36 moves outward on driving clutch sheaves 44, 46 during the high parasite drag. In other words, setting the shift rate during high parasite drag (i.e., portion 106 of shift curve 93). Shift curve 93 represents a partial throttle acceleration profile utilizing a driving clutch in accordance with the present invention.

The present invention accommodates all of these considerations. With reference to FIG. 4, engagement speed 100 at which movable sheave 46 of driving clutch 30 engages endless belt 36 as the rotational speed of driving clutch 30 is increased is determined by the amount of pretension or preload that has been applied to variable rate biasing or resistance means 60 when installed. The amount of pretension can be adjusted by using spacer 78 or by rotating threaded end cap 72. By increasing the width of spacer 78 or by rotating threaded end cap 72 inward toward speed responsive or displacement means housing 64, additional pretension is applied. Therefore, a greater engine speed, thus rotational speed is required of driving clutch 30 before speed responsive or displacement elements 38 acting on rollers 62 push axially movable sheave 46 enough to engage belt 36. Conversely, by decreasing the width of spacer 78 or by rotating threaded end cap 72 outward away from speed responsive or displacement means housing 64, less pretension is applied (i.e., the preload is decreased). Therefore, less rotational speed of driving clutch 30 is required before the speed responsive or displacement elements push movable sheave 46 enough to engage belt 36.

Shiftout point 102 occurs when the centrifugal force of speed responsive or displacement elements 38 acting on rollers 62 overcome the belt side pressure applied to belt 36 by the biasing means in driven clutch 32 and the driving clutch 30. Shiftout point 102 is also controlled by the amount of throttle applied by the user. Using biasing or resistance means 60 in accordance with the present invention and a partial throttle acceleration, the transmission will have shiftout speed 102'. With full throttle acceleration, the transmission will have shiftout speed 102".

The rate at which movable sheave 46 moves axially and thus the rate at which the belt moves outward on the sheaves 44, 46 of driving clutch 30 during the low parasite drag portion of the upshift (approximately 20 to 50 m.p.h. for a snowmobile) as the vehicle speed increases corresponds to straight portion 104 of shift curve 93. Portion 104 of shift curve 93 is controlled by using biasing or resistance means 60. Ideally, the engine speed is held constant in portion 104 while the transmission is shifting out and the vehicle speed is increasing.

With reference to the rate at which belt 36 moves outward on driving clutch sheaves 44, 46, as the rotational speed of driving clutch 30 increases speed responsive or displacement elements 38 are thrown outward against rollers 62 by centrifugal force. This movement is opposed initially by the combination of first biasing or resistance means 50, flanged bushing 58, and second biasing or resistance means 52. The belt pressure applied by the driven clutch also opposes the speed responsive or displacement elements but will be omitted for purposes of this discussion. First biasing or resistance means 50 and second biasing or resistance means 52 are under compression between speed responsive or displacement means housing 64 and end cover 74. First biasing or resistance means 50, flanged bushing 58, and second biasing or resistance means 52 are simultaneously compressed by end cap 72 as movable sheave 46 moves toward fixed sheave 44. The compression of all three of these elements simultaneously provides one linear spring rate that is relatively low in order to accommodate the low parasite drag of the vehicle.

By way of example, first biasing or resistance means 50 is a heavy rate spring, for example 230 lbs/in, and second biasing or resistance means 52 is a light rate spring, say 144 lbs/in. Surprisingly what I have discovered is that when first biasing or resistance means 50 and second biasing or resistance means 52 are coaxially aligned with each end of the springs free to move, a spring rate of 88 lbs/in results, instead of a spring rate close to either individual spring. The net rate of the two springs is approximated by the formula:

$$\text{Net Sprong Rate} = \frac{1}{\frac{1}{K_a} + \frac{1}{K_b}}$$

where:

$K_a$=heavy spring rate $K_b$=light spring rate

In this example when biasing or resistance means 50 and biasing or resistance means 52 are acting together a spring rate of 88 lbs/in plus the predetermined pretension oppose the centrifugal forces of speed responsive or displacement elements 38. Biasing or resistance means 50 and biasing or resistance means 52 act in concert until the two biasing or resistance means have been compressed such that flanged bushing 58 contacts shoulder 81 of bushing stop 80. At that point, first biasing or resistance means 50 is stopped from further compression by bushing stop 80. Then with any further increase in the rotational speed of driving clutch 30, biasing or resistance means 52 acts alone to oppose speed responsive or displacement elements 38.

Figure 1:
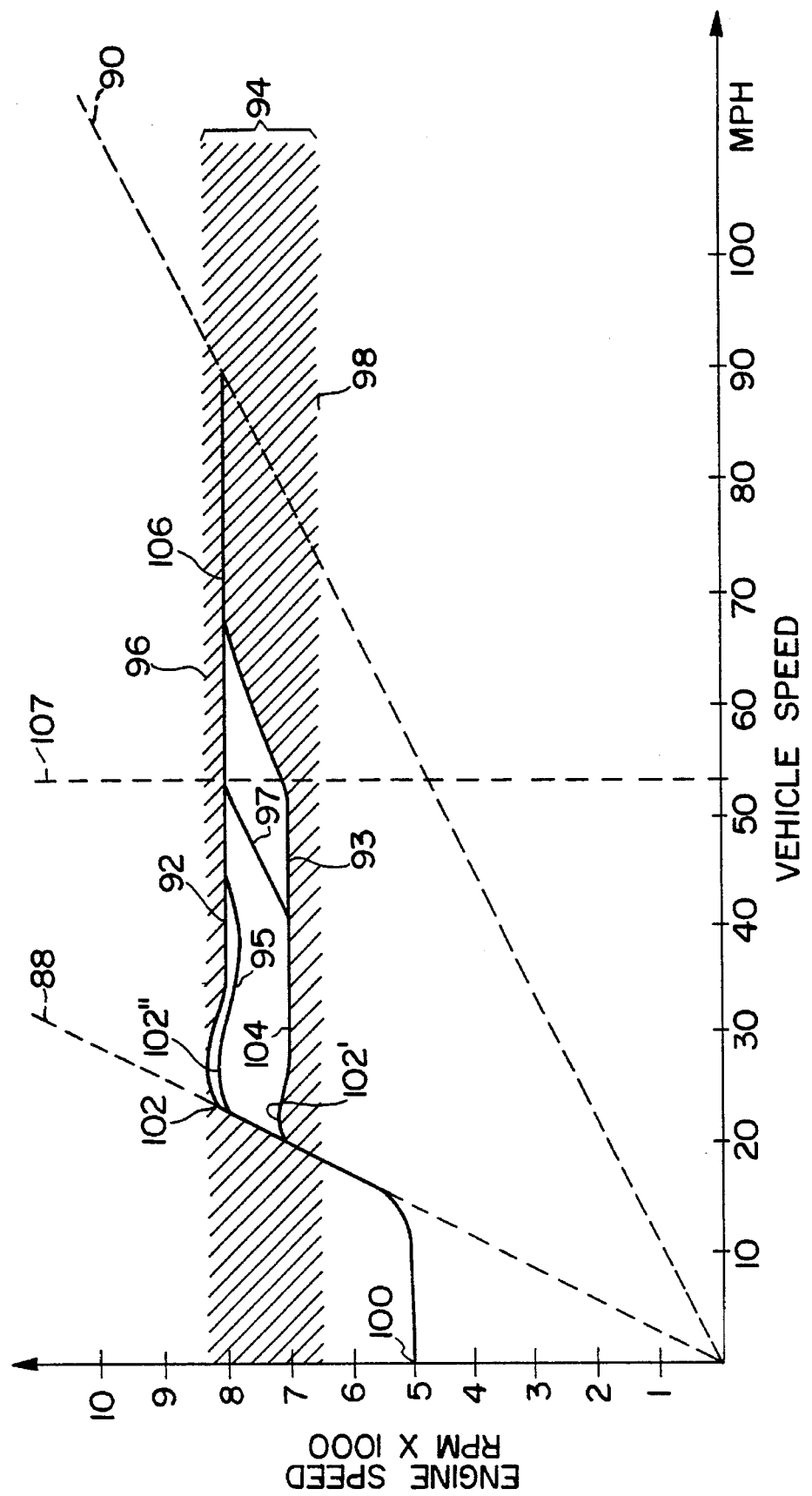
FIG. 1 is a speed diagram.

With reference to FIG. 1, at partial throttle acceleration 93, biasing or resistance means 50 and biasing or resistance means 52 act in concert to hold the engine speed in bottom part 98 of power band 94 along portion 104 of shift curve 93. By holding the engine speed to that predetermined amount greater fuel efficiency and lower noise and vibration are achieved at normal cruise speeds.

At predetermined vehicle speed 107, the vehicle transitions from cruising speeds to performance speeds. At speed 107, flanged bushing 58 contacts shoulder 81 of bushing stop 80. At that point, first biasing or resistance means 50 is stopped from further compression by bushing stop 80. The engine speed then transitions to portion 106 of shift curve 93 where biasing or resistance means 52 acts to oppose speed responsive or displacement elements 38. Shift curve 97 represents a conventional clutch operating at partial throttle. As FIG. 1 shows, the engine speed is not held in the fuel efficient portion of the power band 94 for very long with a conventional clutch set-up.

The rate at which the movable sheave moves axially and thus the rate at which belt 36 moves outward on driving clutch sheaves 44, 46 during high parasite drag portion 106 of the upshift as the vehicle increases speed is controlled by second biasing or resistance means 52. High parasite drag becomes a factor where the vehicle will no longer accelerate without additional engine speed. For a typical snowmobile, that point coincides with a speed of approximately 40 m.p.h. Ideally, the engine speed is held constant during portion 106 while the transmission is shifting out farther. At the point where high parasite drag becomes a factor, the axial movement of movable sheave 46 and thus the rate that belt 36 moves up sheaves 44, 46 needs to be slowed so that enough torque is transmitted to driven clutch 32 through endless belt 36 to compensate for or overcome the high parasite drag. The point at which driving clutch 30 compensates for the high parasite drag is set using bushing stop 80 and primarily shim 82.

The transmission is tuned so that first biasing or resistance means 50 is stopped and second biasing or resistance means 52 begins to act alone so as to change the engine speed from lower part 98 of power band 94 where the engine operates the most efficiently to higher part 96 of power band 94 to effect a high performance condition. This occurs because in our example second biasing or resistance means 52 exerts a spring rate of 142 lbs/in against speed responsive or displacement elements 38 as opposed to the combined spring rate of 88 lbs/in which was being exerted before the first biasing or resistance means 50 was stopped.

At the predetermined point chosen to correspond to the beginning of a performance speed range, flanged bushing 58 has been axially displaced toward bushing stop 80 enough for flanged bushing 58 to contact a shoulder 81 on bushing stop 80. At that point, first biasing or resistance means 50 is prevented from further compression. Second biasing or resistance means 52 continues to be compressed but operates alone to provide a second linear spring rate. The second linear spring rate is higher than the combined spring rate so that movable sheave 46 encounters increased axial resistance. The result being that the rate at which belt 36 travels up sheaves 44,46 is slowed and more torque is transmitted to driven clutch 32 through belt 36 to compensate for the increased parasite drag.

Bushing stop 80 should be as thin as practical to not bind but still have enough integrity to withstand the forces of the biasing or resistance means. Bushing stop 80 is shown as a cylindrical column or shaft but it will be appreciated by one of ordinary skill in the art that bushing stop 80 could be other means such as a pin or protrusion extending from the surface of center column or shaft 84 so that it does not interfere with the movement of first biasing or resistance means 50 but contacts flanged bushing 58.

With reference to FIG. 1, at full throttle acceleration the transmission with the variable rate biasing or resistance means installed operates along shift curve 95. As discussed above at full throttle acceleration the transmission will shiftout at shiftout speed 102". Then the biasing or resistance means in accordance with the present invention will hold the engine speed at the top 96 of power band 94 so that maximum performance is achieved as opposed to maximum fuel efficiency.

The present invention also provides advantages in the back shifting of the transmission because the belt side pressure can be lower in the driven clutch during the low parasite drag portion because the engine speed is reduced.

As one of ordinary skill in the art is aware the tuning of variable speed belt drive transmissions is a trial and error procedure that becomes more simplified with experience. There are different spring and weight combinations for each machine, altitude and engine horsepower. There are also variations depending on how the machine is to be used (i.e., drag racing, hill climbs, cross country racing, touring, etc.). With the present invention, the driving clutch can be tuned to maximize the fuel efficiency of the engine, to attain the highest performance for the engine, or a combination of both.

As will be recognized by one of ordinary skill in the art, selection of the two compression springs is a relatively simple procedure. First, find a single rate spring that gives the best fuel efficiency by holding the engine speed at the bottom of the power band. Second, find a single rate spring that gives the best performance by holding the engine speed at its power peak. The rates of each of these two springs are the two desired rates for use in the present invention. Third, because the spring rate that corresponds to the best fuel efficiency is achieved in one embodiment of the present invention by two springs acting in concert, that spring rate has to be put into the spring rate formula discussed above as the net spring rate and the spring rate corresponding to best performance has to be put in as $K_b$ so that the spring rate $K_a$ is determined. The spring rate $K_a$ will be the first compression spring rate and $K_b$ will be the second compression spring rate.

Figure 5:
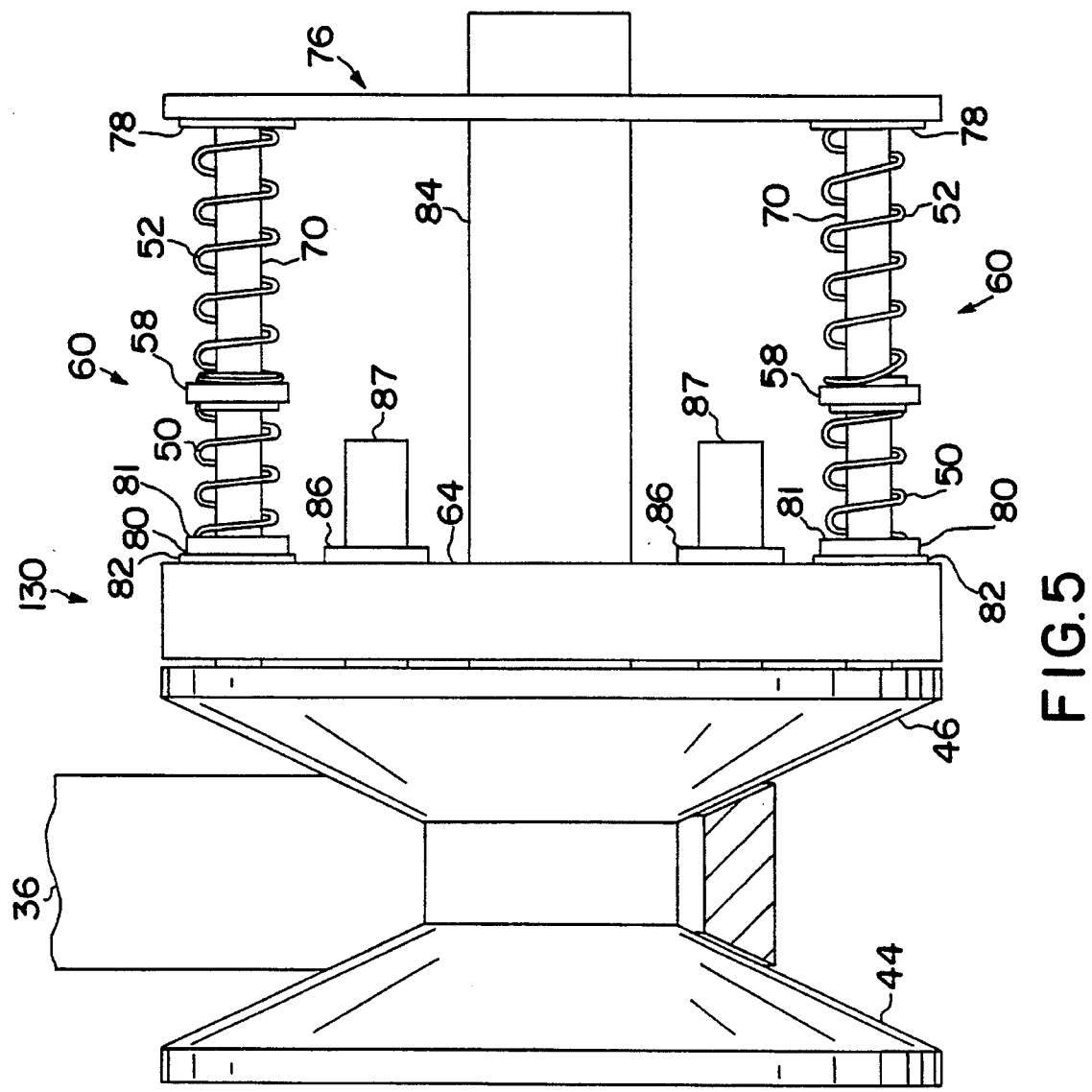
FIG. 5 is a top plan sectional view partially in cross-section of an alternate embodiment of the drive clutch of the present invention.

FIG. 5 is directed to another embodiment of the present invention. Drive clutch 130 operates the same as previously discussed. As the drive shaft (not shown) rotates and the speed of driving clutch 130 increases, the speed responsive or displacement elements (not shown) located inside of speed responsive or displacement means housing 64 are thrown outward against rollers journalled inside speed responsive or displacement means housing 64 by centrifugal force. The speed responsive or displacement elements acting on the rollers push axially movable sheave 46 of drive clutch 130 toward fixed sheave 44.

A plurality of sets of variable rate biasing or resistance means 60, made up of first biasing or resistance means 50, second biasing or resistance means 52, and flanged bushing 58, are spaced radially outward from, and generally parallel to, center column or shaft 84. Preferably, three sets of variable rate biasing or resistance means 60 are used. The plurality of sets of biasing or resistance means 60 are under compression between speed responsive or displacement means housing 64 and end plate 76. The force of biasing or resistance means 60 is transmitted through tower bolts 70 to moveable sheave 46 to oppose the force from the speed responsive or displacement elements. In accordance with one embodiment, guide shafts 87 and guide shaft bearings 86 are provided to prevent binding and help facilitate axial movement of tower bolts 70 in speed responsive or displacement means housing 64 as sheave 46 moves toward sheave 44.

Figure 6:
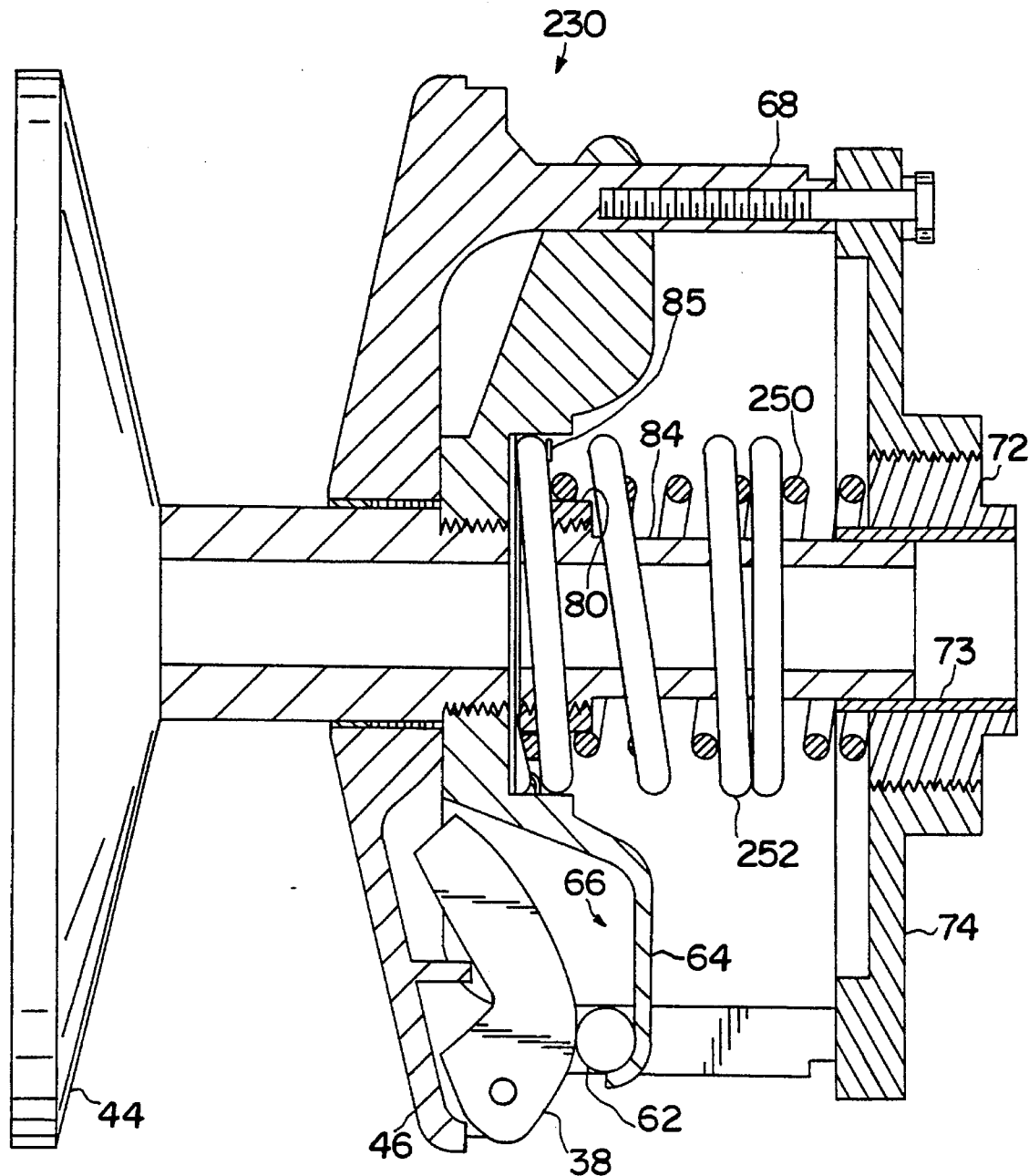
FIG. 6 is a top plan sectional view partially in cross-section of another embodiment of the drive clutch of the present invention.

FIG. 6 shows another embodiment of the present invention which achieves all of the objectives of the present invention. Drive clutch 230 operates similar to the drive clutches previously discussed. Engagement speed 100 at which movable sheave 46 of driving clutch 230 engages the endless belt as the rotational speed of driving clutch 230 is increased is determined by the amount of pretension or preload that has been applied to biasing or resistance means 250 when installed. The amount of pretension can be adjusted by rotating threaded end cap 72. By rotating threaded end cap 72 inward toward speed responsive or displacement means housing 64, additional pretension is applied. Therefore, a greater engine speed, thus rotational speed is required of driving clutch 230 before speed responsive or displacement elements 38 acting on rollers 62 push axially movable sheave 46 enough to engage the belt. Conversely, by rotating threaded end cap 72 outward away from speed responsive or displacement means housing 64, less pretension is applied (i.e., the preload is decreased). Therefore, less rotational speed of driving clutch 230 is required before the speed responsive or displacement elements push movable sheave 46 enough to engage belt 36.

The shiftout point is also controlled by the amount of throttle applied by the user. Using biasing or resistance means 250 in accordance with the present invention and a partial throttle acceleration, the transmission will have shiftout speed 102'. With full throttle acceleration, the transmission will have shiftout speed 102".

The rate at which movable sheave 46 moves axially and thus the rate at which the belt moves outward on the sheaves 44, 46 of driving clutch 230 during the low parasite drag portion of the upshift (approximately 20 to 50 m.p.h. for the snowmobile) as the vehicle speed increases is controlled by using first biasing or resistance means 250. First biasing or resistance means 250 and second biasing or resistance means 252 are coaxially mounted around center column or shaft 84 but first biasing or resistance means 250 extends beyond the end of second biasing or resistance means 252. First biasing or resistance means 250 has a smaller diameter than second biasing or resistance means 252, however, first biasing or resistance means 250 could have the larger diameter and second biasing or resistance means 252 could have the smaller diameter. First biasing or resistance means 250 is compressed with a predetermined preload between end cap 72 and speed responsive or displacement means housing 64. Second biasing or resistance means 252 is non-compressed initially and is held in place by retaining clip 85.

With reference to the rate at which belt 36 moves outward on driving clutch sheaves 44, 46, as the rotational speed of driving clutch 230 increases. This movement is opposed initially by first biasing or resistance means 250. The belt pressure applied by the driven clutch also opposes the speed responsive or displacement elements but will be omitted for purposes of this discussion. First biasing or resistance means

250 is under compression between speed responsive or displacement means housing 64 and end cover 74. First biasing or resistance means 250 is compressed by end cap 72 as movable sheave 46 moves toward fixed sheave 44. The compression of first biasing or resistance means 250 provides one linear spring rate that is relatively low in order to accommodate the low parasite drag of the vehicle.

By way of example, first biasing or resistance means 250 is a light rate spring, for example 88 lbs/in. In this example, a spring rate of 88 lbs/in plus the predetermined pretension oppose the centrifugal forces of speed responsive or displacement elements 38. First biasing or resistance means 250 acts alone until it has been compressed such that end cover 74 and/or end cap 72 contacts second biasing or resistance means 252. At that point, first biasing or resistance means 250 and second biasing or resistance means 252 begin to operate in concert with each other. Then with any further increase in the rotational speed of driving clutch 230, first biasing or resistance means 250 and second biasing or resistance means 252 act together to oppose speed responsive or displacement elements 38.

With reference to FIG. 1, at partial throttle acceleration 93, first biasing or resistance means 250 acts alone (ignoring the belt side pressure created by the driven clutch biasing means) to hold the engine speed in bottom part 98 of power band 94 along portion 104 of shift curve 93. By holding the engine speed to that predetermined amount greater fuel efficiency and lower noise and vibration are achieved at normal cruise speeds.

At predetermined vehicle speed 107, the vehicle transitions from cruising speeds to performance speeds. At speed 107, end cover 74 and/or end cap 72 contacts second biasing or resistance means 252. At that point, first biasing or resistance means 250 and second biasing or resistance means 252 act together to control the engine speed. The engine speed then transitions to portion 106 of shift curve 93 where first biasing or resistance means 250 and second biasing or resistance means 252 act to oppose speed responsive or displacement elements 38.

The rate at which the movable sheave moves axially and thus the rate at which belt 36 moves outward on driving clutch sheaves 44, 46 during high parasite drag portion 106 of the upshift as the vehicle increases speed is controlled by first biasing or resistance means 250 and second biasing or resistance means 252 acting together. The point at which driving clutch 230 compensates for the high parasite drag is set by the length of second biasing or resistance means 252.

The transmission is tuned so that second biasing or resistance means 252 begins to act with first biasing or resistance means 250 so as to change the engine speed from lower part 98 of power band 94 where the engine operates the most efficiently to higher part 96 of power band 94 to effect a high performance condition. This occurs because in our example second biasing or resistance means 252 exerts a spring rate of approximately 142 lbs/in and first biasing or resistance means 250 exerts a spring rate of approximately 88 lbs/in for a combined spring rate of 230 lbs/in acting against speed responsive or displacement elements 38 as opposed to the initial spring rate of 88 lbs/in which was being exerted by first biasing or resistance means 250 alone.

At the predetermined point chosen to correspond to the beginning of a performance speed range, end cover 74 and/or end cap 72 has been axially displaced enough to contact second biasing or resistance means 252. At that point, first biasing or resistance means 250 and second biasing or resistance means 252 operate together to provide a second linear spring rate. The second linear spring rate is higher than the first linear spring rate provided by first biasing or resistance means 250 so that movable sheave 46 encounters increased axial resistance. The result being that the rate at which the belt travels up sheaves 44,46 is slowed and more torque is transmitted to driven clutch 32 through belt 36 to compensate for the increased parasite drag.

As will be recognized by one of ordinary skill in the art, selection of the compression spring and the tension spring for use in the embodiment of the present invention shown in FIG. 6 is a relatively simple procedure. First, find a single rate spring that gives the best fuel efficiency by holding the engine speed at the bottom of the power band. This will be the first spring rate and is the spring rate for biasing or resistance means 250. Second, find a single rate spring that gives the best performance by holding the engine speed at its power peak. The rates of each of these two springs are the two desired rates for use in the present invention. Third, because the spring rate that corresponds to the best performance is achieved in the present embodiment by two springs acting together, the first spring rate has to be subtracted from the second spring rate so that the spring rate for biasing or resistance means 252 is determined.

Figure 7:
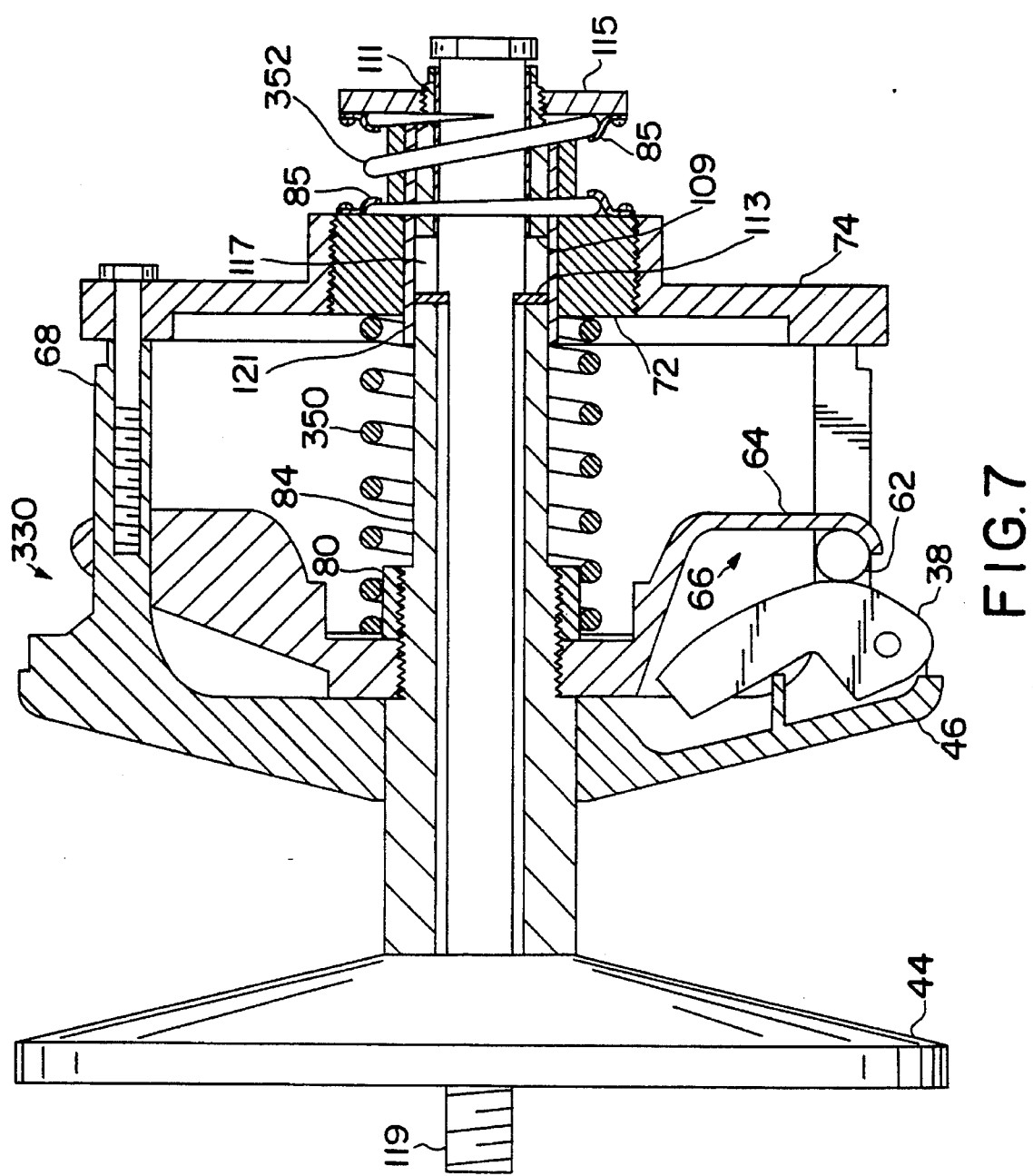
FIG. 7 is a top plan sectional view partially in cross-section of yet another embodiment of the drive clutch in accordance with the present invention.

FIG. 7 shows yet another embodiment of the present invention which achieves all of the objectives of the present invention. Drive clutch 330 operates similar to the drive clutches previously discussed. Engagement speed 100 at which movable sheave 46 of driving clutch 330 engages the endless belt as the rotational speed of driving clutch 330 is increased is determined by the amount of pretension or preload that has been applied to biasing or resistance means 350 when installed. The amount of pretension can be adjusted by rotating threaded end cap 72. By rotating threaded end cap 72 inward toward speed responsive or displacement means housing 64, additional pretension is applied. Therefore, a greater engine speed, thus rotational speed is required of driving clutch 330 before speed responsive or displacement elements 38 acting on rollers 62 push axially movable sheave 46 enough to engage the belt. Conversely, by rotating threaded end cap 72 outward away from speed responsive or displacement means housing 64, less pretension is applied (i.e., the preload is decreased). Therefore, less rotational speed of driving clutch 330 is required before the speed responsive or displacement elements push movable sheave 46 enough to engage belt 36.

The shiftout point is also controlled by the amount of throttle applied by the user. Using biasing or resistance means 350 in accordance with the present invention and a partial throttle acceleration, the transmission will have shiftout speed 102'. With full throttle acceleration, the transmission will have shiftout speed 102".

The rate at which movable sheave 46 moves axially and thus the rate at which the belt moves outward on the sheaves 44, 46 of driving clutch 330 during the low parasite drag portion of the upshift (approximately 20 to 50 m.p.h. for the snowmobile) as the vehicle speed increases is controlled by using first biasing or resistance means 350. First biasing or resistance means 350 is compressed with a predetermined preload between end cap 72 and speed responsive or displacement means housing 64. Second biasing or resistance means 352 is a tension biasing or resistance means and initially has no preload on it. Second biasing or resistance means 352 is held in place by retaining clips 85.

With reference to the rate at which belt 36 moves outward on driving clutch sheaves 44, 46, as the rotational speed of driving clutch 330 increases. This movement is opposed initially by first biasing or resistance means 350. The belt pressure applied by the driven clutch also opposes the speed responsive or displacement elements but will be omitted for purposes of this discussion. First biasing or resistance means 350 is under compression between speed responsive or displacement means housing 64 and end cover 74. First biasing or resistance means 350 is compressed by end cap 72 as movable sheave 46 moves toward fixed sheave 44. The compression of first biasing or resistance means 350 provides one linear spring rate that is relatively low in order to accommodate the low parasite drag of the vehicle.

By way of example, first biasing or resistance means 350 is a heavy rate spring, for example 230 lbs/in, and second biasing or resistance means 352 is a light rate spring, say 60 lbs/in. First biasing or resistance means 350 acts alone until it has been compressed such that end 109 of plug 111 contacts washer 113. At that point, first biasing or resistance means 350 and second biasing or resistance means 352 begin to operate in concert with each other. Second biasing or resistance means 352 is put in tension at that point. Then with any further increase in the rotational speed of driving clutch 330, first biasing or resistance means 350 and second biasing or resistance means 352 act together to oppose speed responsive or displacement elements 38.

Plug 111 is threadingly attached to shoulder or collar 115. In this way, the gap 117 can be increased or decreased to set the point when the end 109 of the plug 113 contacts washer 113. Mounting bolt 119 extends through the drive clutch 330 in order to attach the drive clutch to the drive shaft 28. Bushing 121 helps facilitate the translation of plug 111, end plate 74 and end cap 72. Bushing 121 reduces the friction within the clutch 330 and helps to improve clutch efficiency.

With reference to FIG. 1, at partial throttle acceleration 93, first biasing or resistance means 350 acts alone (ignoring the belt side pressure created by the driven clutch biasing means) to hold the engine speed in bottom part 98 of power band 94 along portion 104 of shift curve 93. By holding the engine speed to that predetermined amount greater fuel efficiency and lower noise and vibration are achieved at normal cruise speeds.

At predetermined vehicle speed 107, the vehicle transitions from cruising speeds to performance speeds. At speed 107, end 109 of plug 111 contacts washer 113. At that point, first biasing or resistance means 350 and second biasing or resistance means 352 act together to control the engine speed. The engine speed then transitions to portion 106 of shift curve 93 where first biasing or resistance means 350 and second biasing or resistance means 352 act to oppose speed responsive or displacement elements 38.

The rate at which the movable sheave moves axially and thus the rate at which belt 36 moves outward on driving clutch sheaves 44, 46 during high parasite drag portion 106 of the upshift as the vehicle increases speed is controlled by first biasing or resistance means 350 and second biasing or resistance means 352 acting together. The point at which driving clutch 330 compensates for the high parasite drag is set by adjusting plug 111 in shoulder or collar 115.

The transmission is tuned so that second biasing or resistance means 352 begins to act with first biasing or resistance means 350 so as to change the engine speed from lower part 98 of power band 94 where the engine operates the most efficiently to higher part 96 of power band 94 to effect a high performance condition.

At the predetermined point chosen to correspond to the beginning of a performance speed range, end 109 of plug 111 has been axially displaced enough to contact washer 113. At that point, first biasing or resistance means 350 and second biasing or resistance means 352 operate together to provide a second linear spring rate. The second linear spring rate is higher than the first linear spring rate provided by first biasing or resistance means 350 so that movable sheave 46 encounters increased axial resistance. The result being that the rate at which the belt travels up sheaves 44,46 is slowed and more torque is transmitted to driven clutch 32 through belt 36 to compensate for the increased parasite drag.

As will be recognized by one of ordinary skill in the art, selection of the compression spring and the tension spring for use in the embodiment of the present invention shown in FIG. 7 is the same procedure as described with regard to the embodiment shown in FIG. 6.

While the invention has been described with reference to the foregoing embodiments, changes and variations may be made thereto which fall within the scope of the appended claims.

What is claimed is:

1. A vehicle having a driven clutch connected by an endless belt to a drive clutch assembly mounted on a drive shaft of an engine, said drive clutch assembly comprising:

a center column for attaching said drive clutch assembly to the drive shaft;

a sheave affixed adjacent one end of said center column for common rotation therewith;

a movable sheave axially movable along said center column relative to a retracted position spaced from said fixed sheave;

a speed responsive means for displacing said movable sheave toward said fixed sheave, said speed responsive means displacing said movable sheave in an amount and to an extent to control the load transfer to said driven clutch by said movable sheave and said sheave through said endless belt;

a variable rate biasing means for urging said movable sheave toward said retracted position; and an end plate attached to said movable sheave, said end plate axially movable relative to said center column;

said variable rate biasing means initially applying a first predetermined resistance as said movable sheave moves toward said fixed sheave, said variable rate biasing means applying a second predetermined resistance when said movable sheave reaches a predetermined axial position.

2. The vehicle of claim 1, wherein said first predetermined resistance is less than said second predetermined resistance.

3. The vehicle of claim 2 wherein said variable rate biasing means is an actuator.

4. The vehicle of claim 1 further comprising: a bushing stop having a shoulder;

said variable rate biasing means comprising,
 a first biasing means having a first end and a second end, and
 a second biasing means having a first end and a second end; and a flanged bushing axially movable relative to said center column, said flanged bushing abutting said second end of said first biasing means and said first end of said second biasing means;

said flanged bushing initially allowing said first biasing means and said second biasing means to be compressed simultaneously as said movable sheave moves toward said fixed sheave, said flanged bushing preventing compression of said first biasing means at a predetermined axial position when said flanged bushing abuts said shoulder of said bushing stop.

5. The vehicle of claim 4, wherein said first biasing means is a stiffer biasing means than said second biasing means.

6. The vehicle of claim 4 wherein the first biasing means is a compression spring, a wave spring, an elastomer, an air bladder, a hydraulic device, an electromechanical device, an electromechanical actuator, a mechanical actuator, a pneumatic actuator, a hydraulic actuator, or a pneumatic device.

7. The vehicle of claim 6 wherein the second biasing means is a compression spring, a wave spring, an elastomer, an air bladder, a hydraulic device, an electromechanical device, an electromechanical actuator, a mechanical actuator, a pneumatic actuator, a hydraulic actuator, or a pneumatic device.

8. The vehicle of claim 5, wherein said bushing stop is adjacent to said speed responsive means.

9. The vehicle of claim 8, wherein said bushing stop is adjustable for varying the axial position at which said flanged bushing prevents compression of said first biasing means.

10. The vehicle of claim 5, wherein said end plate is adjustable for preloading said variable rate biasing means to a predetermined amount.

11. The vehicle of claim 5, wherein said variable rate biasing means, said end plate, said flanged bushing, and said bushing stop are mounted concentrically around said center column.

12. The vehicle of claim 5, wherein said biasing means further comprises a plurality of sets of said first biasing means and said second biasing means, said plurality of sets radially spaced from said center column and parallel thereto.

13. The vehicle of claim 5, wherein said first biasing means is a compression spring and said second biasing means is a compression spring.

14. A vehicle having a driven clutch connected by an endless belt to a drive clutch assembly mounted on a drive shaft of an engine, said drive clutch assembly comprising:
 a shaft for attaching said drive clutch assembly to the drive shaft;
 a sheave attached adjacent to one end of said shaft for common rotation therewith;
 a movable sheave axially movable over said shaft relative to a retracted position spaced from said fixed sheave;
 a displacement means for displacing said movable sheave toward said fixed sheave, said displacement means displacing said movable sheave in an amount and to an extent to control the torque transferred to said driven clutch by said drive clutch assembly through said endless belt; and
 a variable rate resistance means for urging said movable sheave toward said retracted position;
 said variable rate resistance means comprises:
  a first resistance means having a first end; and
  a second resistance means having a first end;
  said first resistance means being mounted coaxially with said second resistance means;
  said first end of said first resistance means extending past said first end of said second resistance means;
  said first resistance means initially being compressed alone as said movable sheave moves toward said fixed sheave;
  said first resistance means and said second resistance means being compressed simultaneously when said movable sheave reaches a predetermined axial position.

15. The vehicle of claim 14 further comprising an end cap attached to said movable sheave and axially movable relative to said shaft.

16. The vehicle of claim 15 wherein said end cap is adjustable.

17. The vehicle of claim 14 wherein said first resistance means is a compression spring and said second resistance means is a compression spring.

18. A vehicle having a driven clutch connected by an endless belt to a drive clutch assembly mounted on a drive shaft of an engine, said drive clutch assembly comprising:
 a shaft for attaching said drive clutch assembly to the drive shaft;
 a sheave attached adjacent to one end of said shaft for common rotation therewith;
 a movable sheave axially movable over said shaft relative to a retracted position spaced from said fixed sheave;
 a displacement means for displacing said movable sheave toward said fixed sheave, said displacement means displacing said movable sheave in an amount and to an extent to control the torque transferred to said driven clutch by said drive clutch assembly through said endless belt;
 a variable rate resistance means for urging said movable sheave toward said retracted position; and
 an end cap attached to said movable sheave and being axially movable relative to said center column;
 said variable rate resistance means comprises:
  a first resistance means mounted between said displacement means and said end cap;
  a collar mounted on an end of said shaft opposite said fixed sheave; and
  a second resistance means mounted between said end cap and said collar;
 said variable rate resistance means initially applying a first predetermined resistance as said movable sheave moves toward said fixed sheave, said variable rate resistance means applying a second predetermined resistance when said movable sheaves reaches a predetermined axial position.

19. The vehicle of claim 18 wherein said first resistance means is in compression and said second resistance means is in tension when said movable sheave reaches said predetermined axial position.

20. The vehicle of claim 19 further comprising:
 a plug axially movable along said shaft and threadingly engaged with said collar;
 said plug sets said predetermined axial position where said variable rate resistance means applies said second predetermined resistance.

21. The vehicle of claim 18 wherein said end cap is adjustable.

22. An improved drive clutch assembly of the type having a center column for attaching said drive clutch assembly to a motor or engine drive shaft, a sheave affixed on said center column for common rotation therewith, a movable sheave axially slidable along said center column from a retracted position axially spaced from said sheave, speed responsive means for displacing said movable sheave toward said sheave in accordance with an increase in the speed of the drive shaft, an end plate attached to said movable sheave and axially movable parallel to said center column, and a bushing stop adjustably fixed relative to said sheave and having a shoulder surface, the improvement comprising:
 a variable rate biasing means for urging said movable sheave toward a retracted position;
 said variable rate biasing means initially applying a first predetermined resistance as said movable sheave moves toward said fixed sheave, said variable rate biasing means applying a second predetermined resistance when said movable sheave reaches a predetermined axial position.

23. The improved drive clutch assembly of claim 22, wherein said first predetermined resistance is less than said second predetermined resistance.

24. The improved drive clutch assembly of claim 22, wherein said variable rate biasing means comprises:

a first biasing means having a first end and a second end;

a second biasing means having a first end and a second end; and a flanged bushing axially abutting said second end of said first biasing means and said first end of said second biasing means for axial movement thereof relative to said center column;

said flanged bushing initially allowing said first biasing means and said second biasing means to be compressed simultaneously as said speed responsive means moves said movable sheave axially toward said sheave and said flanged bushing preventing compression of said first biasing means at a predetermined axial position when said flanged bushing abuts said shoulder of said bushing stop.

25. The improved drive clutch assembly of claim 22, wherein said variable rate biasing means comprises a first compression spring and a second compression spring.

26. A kit for improving the performance of a drive clutch assembly of the type having a center column for attaching said drive clutch assembly to a drive shaft, a first sheave mounted on said center column for common rotation at a fixed distance from said engine therewith, an axially movable second sheave slidable along said center column from a retracted position spaced from said first sheave, speed responsive means for displacing said movable second sheave toward said first sheave in accordance with an increase in the speed of the drive shaft and for displacing said movable sheave in an amount and to an extent to control the load transfer to sheaves driven by said axially movable sheave and said first sheave by an endless belt, and an end plate attached to said movable sheave and being axially movable along said center column, said kit comprising:

a first biasing means having a first end and a second end for urging said axially movable second sheave toward a retracted position;

a second biasing means having a first end and a second end for urging said axially movable second sheave toward a retracted position;

said first biasing means being a stiffer biasing means than said second biasing means; and a flanged bushing for placing between said second end of said first biasing means and said first end of said second biasing means.

27. The kit of claim 26, further comprising a bushing stop.

28. The kit of claim 27, further comprising an end plate.

29. The kit of claim 27, further comprising a shoulder on said bushing stop for receiving said flanged bushing.

30. The kit of claim 27, further comprising an end plate, said end plate having means for adjustably preloading said biasing means to a predetermined amount.

31. The kit of claim 27, wherein said first biasing means is a compression spring and said second biasing means is a compression spring.

32. A method for controlling the torque transferred to a driven clutch by a drive clutch assembly of the type having a center column for attaching said drive clutch assembly to a motor or engine drive shaft, a sheave affixed on said center column for common rotation therewith, a movable sheave axially slidable along said center column from a retracted position and axially spaced from said sheave, displacement means for displacing said movable sheave toward said sheave, and an end plate attached to said movable sheave and axially movable parallel to said center column, the method comprising:

applying a first predetermined resistance as said movable sheave moves toward said fixed sheave; and applying a second predetermined resistance when said movable sheave reaches a predetermined axial position.

33. The method of claim 32, wherein said first predetermined resistance is less than said second predetermined resistance.

34. The method of claim 32 further comprising: compressing a flanged bushing, a first resistance means and a second resistance means simultaneously as said movable sheave moves toward said fixed sheave; and preventing compression of said first resistance means at a predetermined axial position with said flanged bushing.

35. The method of claim 32 further comprising:

compressing a first resistance means alone as said movable sheave moves toward said fixed sheave; and compressing said first resistance means and a second resistance means simultaneously when said movable sheave reaches a predetermined axial position.

36. The method of claim 32 further comprising:

compressing a first resistance means alone as said movable sheave moves toward said fixed sheave; and compressing said first resistance means and tensioning a second resistance means simultaneously when said movable sheave reaches a predetermined axial position.

\* \* \* \* \*